United States Patent
Bäckman

(10) Patent No.: US 8,298,639 B2
(45) Date of Patent: Oct. 30, 2012

(54) PIPE COMPRISING SUPER SLOW CRACK GROWTH RESISTANT POLYETHYLENE

(75) Inventor: Mats Bäckman, Göteborg (SE)

(73) Assignee: Borealis Technology Oy, Porvoo (FI)

( * ) Notice: Subject to any disclaimer, the term of this patent is extended or adjusted under 35 U.S.C. 154(b) by 284 days.

(21) Appl. No.: 12/531,766

(22) PCT Filed: Feb. 18, 2008

(86) PCT No.: PCT/EP2008/001245
§ 371 (c)(1),
(2), (4) Date: Oct. 7, 2009

(87) PCT Pub. No.: WO2008/131817
PCT Pub. Date: Nov. 6, 2008

(65) Prior Publication Data
US 2010/0035008 A1  Feb. 11, 2010

(30) Foreign Application Priority Data
Apr. 25, 2007 (EP) .................................. 07008371

(51) Int. Cl.
*B32B 1/08* (2006.01)
(52) U.S. Cl. .................. 428/36.92; 428/36.9; 428/34.1; 428/35.7; 526/352
(58) Field of Classification Search ............... 428/36.9, 428/34.1, 35.7, 36.92; 526/352
See application file for complete search history.

(56) References Cited

U.S. PATENT DOCUMENTS
2002/0045711 A1* 4/2002 Backman et al. ............ 525/240

FOREIGN PATENT DOCUMENTS

| EP | 517 868 B1 | 11/1995 |
|---|---|---|
| EP | 1 201 711 A1 | 5/2002 |
| EP | 1 359 192 A1 | 11/2003 |
| EP | 1 655 337 A1 | 5/2006 |
| EP | 1 655 333 B1 | 9/2007 |
| EP | 1 764 385 B1 | 2/2008 |
| EP | 1 719 788 B1 | 7/2008 |
| WO | WO 97/47682 A1 | 12/1997 |
| WO | WO 00/01765 A1 | 1/2000 |
| WO | WO 00/22040 A1 | 4/2000 |
| WO | WO 03/102075 A1 | 12/2003 |

OTHER PUBLICATIONS

International Preliminary Report on Patentability mailed May 13, 2009 for International application No. PCT/EP2008/001245.
International Search Report mailed May 27, 2008 for International application No. PCT/EP2008/001245.
Written Opinion mailed May 27, 2008 for International application No. PCT/EP2008/001245.
Scheirs, John, et al., *PE100 Resins for Pipe Applications: Continuing the Development into the $21^{st}$ Century*, Dec. 1996, Elsevier Science Ltd., vol. 4, No. 12.
Concise Encyclopedia of Polymer Science and Engineering, 2nd Ed., vol. 14, pp. 492-509.

* cited by examiner

*Primary Examiner* — Rena Dye
*Assistant Examiner* — Yan Lan
(74) *Attorney, Agent, or Firm* — Fay Sharpe LLP

(57) ABSTRACT

A pipe or a supplementary pipe article comprising a polyethylene composition comprising a base resin which comprises: (A) a first ethylene homo- or copolymer fraction having an $MFR_2$ in the range of 300 to 700 g/10 min, and (B) a second ethylene homo- or copolymer fraction, wherein fraction (A) has a lower average molecular weight than fraction (B), wherein the base resin has a density in the range of 0.945 to 0.949 kg/cm$^3$ and an $MFR_5$ in the range of 0.2 to 0.4 g/10 min and a comonomer content of higher than 2.0 wt.-% and a SHI(2.7/210) in the range of 55 to 100.

18 Claims, No Drawings

PIPE COMPRISING SUPER SLOW CRACK GROWTH RESISTANT POLYETHYLENE

BACKGROUND OF THE INVENTION

Pipes of polymer material are frequently used for various purposes, such as fluid transport, i.e. transport of liquid or gas, e.g. water or natural gas, during which the fluid can be pressurised. Moreover, the transported fluid may have varying temperatures, usually within the temperature range from about 0° C. to about 50° C.

Polymer pipes are generally manufactured by extrusion, or, to a smaller extent, by injection moulding. A conventional plant for extrusion of polymer pipes comprises an extruder, a die-head, a calibrating device, cooling equipment, a pulling device, and a device for cutting or for coiling-up the pipe.

The manufacture of polyethylene materials to be used in pressure pipes is discussed for example in an article by Scheirs et al [Scheirs, Bohm, Boot and Leevers: PE100 Resins for Pipe Applications, TRIP Vol. 4, No 12 (1996) pp. 408-415].

WO 0022040 discloses a pipe having good mechanical properties made from a bimodal resin.

However, in very tough soil conditions, particularly when rock impigments can be feared, as well as under very hard installation conditions, it is desirable to have a pipe material having excellent SCG properties (slow crack growth properties) that is much higher as the SCG properties than presently found in materials in the state of the art. The specific conditions require a pipe material which has a SCG notch test of more than 5,000 hours, preferably 8,000 hours.

At the same time a good balance of processability, impact strength, modulus of elasticity, the rapid crack propagation resistance, and design stress rating of the pipe is required. The present invention solves the problem of providing pipes made from a multimodal material having a unique balance of the above mentioned properties.

SUMMARY OF THE INVENTION

It has now been discovered that the above mentioned problem can be overcome by preparing the pipe from a specific, well defined type of multimodal polyethylene. The present invention relates to a pipe or a supplementary pipe article comprising a polyethylene composition comprising a base resin, whereby the base resin comprises a first ethylene homo- or copolymer fraction (A), and a second ethylene homo- or copolymer fraction (B), wherein fraction (A) has a lower average molecular weight than fraction (B), and wherein the base resin has a density in the range of 0.945 to 0.949 g/cm$^3$ and an MFR$_5$ in the range of 0.2 to 0.4 g/10 min and a comonomer content of higher than 2.0 wt.-% and a SHI(2.7/210) in the range of 55 to 100. The present invention further relates to the use of a polyethylene composition comprising a base resin which comprises a first ethylene homo- or copolymer fraction (A), and a second ethylene homo- or copolymer fraction (B), wherein fraction (A) has a lower average molecular weight than fraction (B), and the base resin has a density in the range of 0.945 to 0.949 g/cm$^3$ and an MFR$_5$ in the range of 0.2 to 0.4 g/10 min and a comonomer content of higher than 2.0 wt.-% and a SHI(2.7/210) in the range of 55 to 100 for the production of a pipe or a supplementary pipe article. Other distinguishing features and advantages of the invention will appear from the following detailed specification and the claims.

DETAILED DESCRIPTION OF THE INVENTION

Where herein the term "pipe" is used it is meant to comprise pipes as well as all supplementary parts for pipes such as fittings, valves, chambers and all other parts which are commonly necessary for a piping system.

The base resin according to the present invention comprises a base resin comprising at least two fractions (A) and (B). The term "base resin" denotes the entirety of polymeric components in the polyethylene composition according to the invention. Preferably, the base resin is consisting of fractions (A) and (B), optionally further comprising a prepolymer fraction in an amount of up to 20 wt %, preferably up to 10 wt %, more preferably up to 5 wt % of the total base resin.

One fraction is denoted fraction (A) and the other fraction is denoted fraction (B). Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal". The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

The overall density of the base resin shall be in the range of 0.945 to 0.949 g/cm$^3$. Preferably, the density is in the range of 0.946 to 0.948 µg/cm$^3$. The MFR$_5$ (ISO 1133, condition T) shall be in the range of 0.2 to 0.4 g/10 min. Preferably, the MFR$_5$ is in the range of 0.2 to 0.3 g/10 min and most preferably in the range of 0.2 to 0.25 g/10 min. The comonomer content shall be higher than 2.0 wt %. Additionally, the shear thinning index at a shear stress of 2.7 kPa and 210 kPa shall be in the range of 55 to 100. Preferably, the shear thinning index SHI (2.7 kPa/210 kPa) is in the range of 66 to 90, and most preferably 72 to 85.

The rheology of the polymer is investigated by determination of the viscosity of the polymer at a very low constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow. At the present invention the viscosity at 747 Pa and 190° C. should be at least 450 kPas. A more detailed description of the steps of the method for determination of the viscosity of the polymer at 747 Pa and 190° C. is given below. The determination is made by using a rheometer, preferably an Anton Paar Physica MCR 300 Rheometer. Rheometers and their function have been described in "Encyclopedia of Polymer Science and Engineering", 2nd Ed., Vol. 14, pp. 492-509. The measurements are performed under a constant stress between two 25 mm diameter plates (constant rotation direction). The gap between the plates is 1.8 mm. An 1.8 mm thick polymer sample is inserted between the plates.

The sample is temperature conditioned at 190° C. during 2 min before the measurement is started. The measurement is performed at 190° C. After temperature conditioning the measurement starts by applying the predetermined stress.

The stress is maintained during 1800 s to let the system approach steady state conditions. After this time the measurement starts and the viscosity is calculated. The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Rheology measurements according to ASTM D 4440-95a may also be used to characterise other important properties of the polymer, such as the molecular weight and molecular weight distribution (MWD).

The use of rheology is advantageous in those cases where the high molecular weight end of the molecular weight distribution is important. Typically, size exclusion chromatography (gel permeation chromatography), which often is used to measure the molecular weight distribution, is not sensitive enough in this molecular weight range.

The storage modulus (G') and the loss modulus (G") together with the absolute value of the complex viscosity ($\eta^*$) as a function of the frequency ($\omega$) or the absolute value of the complex modulus (G*) are obtained by rheology measurements.

$$\eta^* = \sqrt{(G'^2 + G''^2)}/\omega$$

$$G^* = \sqrt{(G'^2 + G''^2)}$$

According to Cox-Merz rule the complex viscosity function, $\eta^*(\omega)$ is the same as the conventional viscosity function (viscosity as a function of shear rate), if frequency is taken in rad/s. If this empiric equation is valid, the absolute value of the complex modulus corresponds to the shear stress in conventional (that is steady state) viscosity measurements. This means that the function $\eta^*(G^*)$ is the same as the viscosity as a function of shear stress. In the present invention the shear stresses (or G*) 2.7 kPa and 210 kPa are used for calculating the $SHI_{2.7/210}$ $$SHI_{2.7/210} = \eta^*_{2.7}/\eta^*_{210}$$

where $\eta^*_{2.7}$ is the complex viscosity at G*=2.7 kPa and
$\eta^*_{210}$ is the complex viscosity at G*=210 kPa.

Preferably, the pipe or the supplementary pipe particle shall comprise a base resin having a complex viscosity $\eta^*_{2.7kPa}$ of higher than 220 kPa·s. More preferably, the $\eta^*_{2.7kPa}$ shall be in the range of 220 kPa·s to 300 kPa·s. Most preferably, the complex viscosity shall be in the range of 230 to 280 kPa·s.

Preferably, the pipe or supplementary pipe article according to the present invention has a pressure resistance of at least 500 hours at 5.5 MPa/80° C. The pressure resistance is determined according to ISO 1167 in terms of the number of hours the pipe withstands a certain pressure at a certain temperature before failure.

Preferably, the pipe or supplementary pipe article according to the present invention has a rapid crack propagation (RCP) resistance of below −7° C., more preferably below −8° C. and most preferably below −9° C.

The rapid crack propagation (RCP) resistance of a pipe may be determined according to a method called the S4 test (Small Scale Steady State), which has been developed at Imperial College, London, and which is described in ISO 13477: 1997 (E). According to the RCP-S4 test a pipe is tested, which has an axial length not below 7 pipe diameters. The outer diameter of the pipe is about 110 mm or greater and its wall thickness about 10 mm or greater.

When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to propagate.

If the pipe passes the test at a given temperature, the temperature is lowered successively until a temperature is reached, at which the pipe no longer passes the test, but the crack propagation exceeds 4 times the pipe diameter. The critical temperature ($T_{crit}$) i.e. the ductile brittle transition temperature as measured according to ISO 13477: 1997 (E) is the lowest temperature at which the pipe passes the test. The lower the critical temperature the better, since it results in an extension of the applicability of the pipe. It is desirable for the critical temperature to be around −6° C. or lower. A pressure pipe made of the multimodal polymer composition according to the present invention preferably has an RCP-S4 value of −7° C. or lower, more preferably −8° C. or lower, and most preferably −9° C. or lower.

The pipe or supplementary pipe article according to the present invention preferably also has excellent PENT values. A test specimen from the pipe according to the present invention preferably shows a time to failure of more than 7000 h, more preferably more than 7500 h and most preferably more than 8500 h in the PENT test according to ASTM F 1473 at a constant load of 2.8 MPa (4.4 MPa in the notched segment) and a temperature of 80° C.

The pipe or supplementary pipe article according to the present invention further withstands at least 5000 hours in the notch test (9.2 bar, 80° C.) before failure. More preferably, a pipe or supplementary pipe article according to the present invention withstands at least 8000 hours and most preferably at least 11 500 hours in the notch test (9.2 bar, 80° C.). The notch test is carried out according to ISO 13479.

The pipe or supplementary pipe article according to the present invention preferably shows a Charpy impact strength at 0° C. (ISO 179) of more than 15 kJ/m², more preferably of more than 18 kJ/m² and most preferably of more than 19 kJ/m².

The pipe or supplementary pipe article according to the present invention comprises a base resin having a density of 945 kg/m³ to 949 kg/m³, preferably 946 kg/m³ to 948 kg/m³, most preferably 947 kg/m³ to 948 kg/m³.

Fraction (A) preferably is an ethylene homopolymer. As a matter of definition, the expression "ethylene homopolymer" used herein relates to an ethylene polymer that consists substantially, i.e. to at least 98 wt %, preferably at least 99 wt %, most preferably 99.8 wt % of ethylene units.

The pipe or supplementary pipe article according to the present invention preferably comprises a fraction (A) having a melt flow rate $MFR_2$ (ISO 1133; 190° C., 2.16 kg load) in the range of 300 to 600 g/10 min, more preferably in the range of 350 to 550 and most preferably 400 to 500 g/10 min.

Fraction (B) preferably is an ethylene copolymer comprising at least one alpha-olefin comonomer. Even more preferably, the alpha-olefin comonomer has at least 6 carbon atoms. Most preferably the comonomer is 1-hexene.

The comonomer content of the base resin preferably is in the range of 2.0 to 6.0 wt.-%, more preferably in the range of 2.1 to 4.9 wt.-% and most preferably in the range of 2.1 to 3.9 wt.-%.

The base resin preferably has an $MFR_{21}$ in the range of 4 to 12, more preferably 6 to 11 and most preferably 7 to 10.

The base resin according to the present invention preferably has a flow rate ratio $FRR_{21/5}$ in the range of 20 to 45, more preferably in the range of 30 to 45 and most preferably in the range of 37 to 45.

The weight ratio of fractions A and B in the base resin preferably is in the range of 40:60 to 60:40.

A test specimen from the pipe or supplementary pipe article according to the present invention preferably has a time to failure in the Full Notch Creep Test according to ISO 16770 of at least 2500 h, more preferably of at least 4500 h, most preferably of at least 6000 h (stress level of 4 Mpa/80° C.). The base resin preferably shall have a $\eta_{747}$ of higher than 450 kPa. The pipe or a supplementary pipe article according to the present invention may further preferably comprise a component (C) selected from inorganic fillers, pigments, stabilisers, antioxidant agents, antiacids agents, utilizations agents, processing agents.

The present invention further relates to the use of a polyethylene composition comprising a base resin which comprises a first ethylene homo- or copolymer fraction (A), and a second ethylene homo- or copolymer fraction (B), wherein fraction (A) has a lower average molecular weight than fraction (B), and the base resin has a density in the range of 0.945 to 0.949 μg/cm³ and an $MFR_5$ in the range of 0.2 to 0.4 g/10 min and a comonomer content of higher than 2.0 wt.-% and a SHI(2.7/210) in the range of 55 to 100 for the production of a pipe or a supplementary pipe article.

The base resin according to the present invention is preferably produced in a multistage process wherein e.g. fractions (A) and (B) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13. Thus, although not directly measurable on the multistage process products, the properties of the fractions produced in higher stages of such a multistage process can be determined by applying either or both of the above methods. The skilled person will be able to select the appropriate method.

The polyethylene composition according the invention preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

Further, the polyethylene base resin preferably is an "in-situ"-blend. Such blends are preferably produced in a multistage process. However, an "in-situ"-blend may also be produced in one reaction stage by using two or more different kinds of catalyst.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene composition according to the invention.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage. The order of the stages may, however, also be reversed.

Optionally and advantageously, the main polymerisation stages may be preceded by a prepolymerisation, in which case up to 20% by weight, preferably 1 to 10% by weight, more preferably 1 to 5% by weight, of the total base resin is produced. The prepolymer is preferably an ethylene homopolymer (HDPE). At the prepolymerisation, preferably all of the catalyst is charged into a loop reactor and the prepolymerisation is performed as a slurry polymerisation. Such a prepolymerisation leads to less fine particles being produced in the following reactors and to a more homogeneous product being obtained in the end.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst.

The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture.

It is preferred that the multimodal base resin of the polyethylene composition according to the invention is a bimodal polyethylene mixture consisting of fractions (A) and (B), optionally further comprising a small prepolymerisation fraction in the amount as described above. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the comparatively low-molecular polymer having no content of comonomer is produced in one stage, preferably the first stage, owing to a high content of chain-transfer agent (hydrogen gas), whereas the high-molecular polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 80 to 110° C., more preferably is 90 to 100° C., and most preferably is 92 to 98° C., and the temperature in the gas-phase reactor preferably is 70 to 105° C., more preferably is 75 to 100° C., and most preferably is 85 to 97° C.

A chain-transfer agent, preferably hydrogen, is added as required to the reactors. Preferably the hydrogen/ethylene ratio is adjusted to a range of 100 to 650, more preferably 200 to 550 and most preferably 250 to 550 mol/kmol in the reaction, when the LMW fraction is produced and to a hydrogen/ethylene ratio in the range of 5 to 40, more preferably 10 to 35 most preferably 12 to 32 mol/kmol in the reaction when the HMW fraction is produced.

The composition preferably if produced in a process comprising a compounding step, wherein the composition of the base resin, i.e. the blend, which is typically obtained as a base resin powder from the reactor, is extruded in an extruder and then pelletised to polymer pellets in a manner known in the art.

Preferably, in this extrusion step the filler and, optionally, other additives or other polymer components can be added to the composition.

The extruder may be e.g. any conventionally used compounding or extruder unit.

EXAMPLES

1. Definitions and Measurement Methods a) Density
Density is measured according to ISO 1183/ISO 1872-2B.
b) Melt Flow Rate/Flow Rate Ratio
The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.
c) Rheological Parameters
Rheological parameters such as Shear Thinning Index SHI and Viscosity are determined by using a rheometer, preferably a Anton Paar Physica MCR 300 Rheometer.

d) Rapid Crack Propagation
The rapid crack propagation (RCP) resistance of a pipe is determined according to a method called the S4 test (Small Scale Steady State), which has been developed at Imperial College, London, and which is described in ISO 13477:1997 (E).
e) Charpy Impact Strength
Charpy impact strength was determined according to ISO 179/1eA on V-notched samples at 23° C. (Charpy impact strength (23° C.)) and 0° C. (Charpy impact strength (0° C.)).

Add the method for Full notch creep test (FNCT) determined according to ISO/CD 16770.

The Full Notch Creep Test is carried out according to ISO 16770, whereby the test specimens originate from the pipe. The test specimens are notched on 4 sides at a depth of 1.6 mm. The testing temperature is 80° C. and as the testing media 2 wt % Arkopal N-110 is used. The time to Failure is recorded. Tested at 4.0 MPa Stress.

2. Production of Polymer Compositions and Pipes

A base resin was produced in a multistage reaction comprising a first (pre)polymerisation stage in slurry in a 50 dm³ loop reactor, followed by transferring the slurry to a 500 dm³ loop reactor wherein polymerisation was continued in slurry to produce the low molecular weight component, and a second polymerisation in a gas phase reactor in the presence of the product from the second loop reactor to produce the comonomer containing high molecular weight component. As comonomer, hexene-1 has been used.

As a catalyst, a LYNX 200 available from Engelhard Belgium BVBA, Heverlee, Belgium, has been used.

The polymerisation conditions applied are listed in Table 1.

|  |  | Example | Comparative |
| --- | --- | --- | --- |
| A1 - PREPOLY (PPR) |  |  |  |
| temperature | ° C. | 40 | 40 |
| pressure | bar | 61 | 61 |
| catalyst feed | g/h | 2.5 | 2.5 |
| C2 feed | kg/h | 2.0 | 2.0 |
| H2 feed | g/h | 2.3 | 2.3 |
| Split | wt-% | 2.0 | 2.0 |
| A2 - LOOP (SLR) |  |  |  |
| temperature | ° C. | 95 | 95 |
| pressure | bar | 56 | 56 |
| C2 concentration | mol % | 1.8 | 1.9 |
| H2/C2 ratio | mol/kmol | 482 | 450 |
| production rate | kg/h | 44 | 45 |
| split | wt-% | 48 | 45 |
| $MFR_2$ | g/(10 min) | 450 | 390 |
| density | kg/cum | >970 | >970 |
| A3 - GPR |  |  |  |
| temperature | ° C. | 85 | 85 |
| pressure | bar | 20 | 20 |
| C2 concentration | mol % | 4.7 | 4.5 |
| H2/C2 ratio | mol/kmol | 15.6 | 20.3 |
| C4/C2 | mol/kmol |  | 90 |
| C6/C2 ratio | mol/kmol | 29 |  |
| production rate | kg/h | 48 | 51 |
| split | wt-% | 50 | 52 |
| Base resin density | kg/cum | 947 | 948 |
| Compounding: |  |  |  |
| feed | kg/hr | 281 | 281 |
| screw speed | rpm | 320 | 320 |
| throttle valve opening | mm | 3.1 | 5.2 |
| SEI | kWh/t | 236 | 254 |

-continued

|  |  | Example | Comparative |
|---|---|---|---|
| melt temperature | °C. | 238 | 222 |
| density | kg/cum | 958 | 959 |
| Irg 1010 | ppm | 1100 | 1150 |
| Irg 168/XR | ppm | 1020 | 1200 |
| Cast | ppm | 1420 | 1460 |
| carbon black | wt-% | 2.3 | 2.2 |
| Physical properties |  |  |  |
| $MFR_5$ | g/(10 min) | 0.25 | 0.22 |
| $MFR_{21}$ | 9/(10 min) | 10.6 | 7.8 |
| $FRR_{21/5}$ | — | 44 | 36 |
| Charpy impact/0° C. | $KJ/m^2$ | 21.2 | 15.3 |
| Notch pressure test 9.2 bar/80° C. | h | >10 000 | 2000 |
| FNCT | h | 6100 | 1924 |
| ACT | h | 1603 | — |
| RCP Tc | °C. | −11 | −10 |
| PENT | h | >5000 | 2200 |
| E-mod | MPa | 1080 | 1150 |
| Compound density | $Kg/m^3$ | 958 | 959 |
| Rheology |  |  |  |
| $\eta^*_{2.7}$ | kPas | 319 | 267 |
| $SHI_{2.7/210}$ |  | 76 | 55 |
| $\eta_{747}$ | kPas | 515 | 458 |
| Comonomer content | wt-% | 2.5 | 1.1 |
| Comonomer type |  | 1-hexene | 1-butene |

Pipes were produced by feeding the composition/base resin in pellet form into a conventional Cincinnati pipe extruder for extrusion with a line speed around 1 m/min into diameter 110 mm pipes with a wall thickness of 10 mm.

The invention claimed is:

1. A pipe or a supplementary pipe article comprising a polyethylene composition comprising a base resin which comprises
   (A) a first ethylene homo- or copolymer fraction having an $MFR_2$, measured according to ISO 1133 at 190° C. and a load of 2.16 kg, in the range of 300 to 600 g/10 min, and
   (B) a second ethylene homo- or copolymer fraction,
   wherein fraction (A) has a lower average molecular weight than fraction (B), wherein the base resin has
   a density in the range of 0.945 to 0.949 g/cm³ and
   an $MFR_5$, measured according to ISO 1133 at 190° C. and a load of 5 kg, in the range of 0.2 to 0.4 g/10 min and
   a comonomer content of higher than 2.0 wt.-% and a SHI(2.7/210) in the range of 66 to 90 and
   a $FRR_{21/5}$ in the range of 30 to 60.

2. A pipe or a supplementary pipe article according to claim 1, wherein the base resin has an $\eta_{2.7}$>220 kPa·s.

3. A pipe or a supplementary pipe article according to claim 1, wherein the pipe or supplementary pipe article has a rapid crack propagation (RCP) resistance, measured according to ISO 13477:1997(E), of −7° C. or lower.

4. A pipe or a supplementary pipe article according to claim 1, wherein a test specimen from the pipe has a time to failure of more than 5000 h in the PENT test according to ASTM F 1473 at a constant load of 2.8 MPa and a temperature of 80° C.

5. A pipe or a supplementary pipe article according to claim 1, wherein a test specimen of the pipe or supplementary pipe article withstands at least 5000 hours in the notch test according to ISO 13479 (9.2 bar, 80° C.).

6. A pipe or a supplementary pipe article according to claim 1, wherein the composition has a Charpy Impact Strength, measured according to ISO 179/1eA at 0° C., of more than 15 kJ/m².

7. A pipe or a supplementary pipe article according to claim 1, wherein the base resin has a density in the range of 0.946 g/cm³ to 0.948 g/cm³.

8. A pipe or a supplementary pipe article according to claim 1, wherein fraction (A) is an ethylene homopolymer.

9. A pipe or a supplementary pipe article according to claim 1, wherein fraction (A) has an MFR2, measured according to ISO 1133 at 190° C. and a load of 2.16 kg, in the range of 350 to 550 g/10 min.

10. A pipe or a supplementary pipe article according to claim 1, wherein fraction (B) is an ethylene copolymer comprising at least one alpha-olefin comonomer having at least 6 carbon atoms.

11. A pipe or a supplementary pipe article according to claim 1, wherein the comonomer content of the base resin is in the range of from more than 2.0 wt.-% to 6.0 wt.-%.

12. A pipe or a supplementary pipe article according to claim 1, wherein the weight ratio of fractions (A):(B) in the base resin is in the range of 40:60 to 60:40.

13. A pipe or supplementary pipe article according to claim 1, wherein a test specimen from the pipe has a time to failure in the Full Notch Creep Test according to ISO 16770 of at least 2500 h and a stress level of 4 MPa/80° C.

14. A pipe or supplementary pipe article according to claim 1, wherein the base resin has an $\eta_{747}$ of 450 kPas or higher.

15. A pipe or supplementary pipe article according to claim 1, wherein the base resin has a SHI(2.7/210) in the range of 72 to 85 and a $FRR_{21/5}$ in the range of 37 to 45.

16. A pipe or supplementary pipe article according to claim 1, wherein fraction (A) is a copolymer.

17. A pipe or a supplementary pipe article comprising a polyethylene composition comprising a base resin which comprises
   (A) an ethylene homopolymer fraction having an $MFR_2$, measured according to ISO 1133 at 190° C. and a load of 2.16 kg, in the range of 300 to 600 g/10 min, and
   (B) an ethylene copolymer fraction,
   wherein fraction (A) has a lower average molecular weight than fraction (B), and wherein the base resin has
   a density in the range of 0.945 to 0.949 g/cm³,
   an $MFR_5$, measured according to ISO 1133 at 190° C. and a load of 5 kg, in the range of 0.2 to 0.4 g/10 min,
   a comonomer content of higher than 2.0 wt.-%,
   an SHI(2.7/210) in the range of 66 to 90, and
   a Charpy Impact Strength, measured according to ISO 179/1eA at 0° C., of more than 19 kJ/m², and
   a $FRR_{21/5}$ in the range of 30 to 60.

18. A method for producing a pipe or a supplementary pipe article, comprising: extruding or injection moulding a polyethylene composition comprising a base resin which comprises:
   (A) a first ethylene homo- or copolymer fraction, and
   (B) a second ethylene homo- or copolymer fraction,
   wherein fraction (A) has a lower average molecular weight than fraction (B), and the base resin has
   a density in the range of 0.945 to 0.949 g/cm³ and
   an $MFR_5$, measured according to ISO 1133 at 190° C. and a load of 5 kg, in the range of 0.2 to 0.4 g/10 min and
   a comonomer content of higher than 2.0 wt.-% and
   a SHI(2.7/210) in the range of 66 to 90 and
   a $FRR_{21/5}$ in the range of 30 to 60.

* * * * *